US009649958B2

(12) United States Patent
Wang et al.

(10) Patent No.: US 9,649,958 B2
(45) Date of Patent: May 16, 2017

(54) FOUR-WAY ADJUSTABLE HEADREST (71) Applicant: DAIMAY NORTH AMERICA AUTOMOTIVE, INC., Redford, MI (US)

(72) Inventors: Jianhua Wang, Novi, MI (US); Yingtai Jiang, Shanghai (CN); Chengke Tong, Shanghai (CN); Xiaoguang Wang, Windsor (CA)

(73) Assignee: DAIMAY NORTH AMERICA AUTOMOTIVE, INC., Redford, MI (US)

( * ) Notice: Subject to any disclaimer, the term of this patent is extended or adjusted under 35 U.S.C. 154(b) by 0 days.

(21) Appl. No.: 14/541,778

(22) Filed: Nov. 14, 2014

(65) Prior Publication Data
US 2015/0203008 A1    Jul. 23, 2015

Related U.S. Application Data (63) Continuation of application No. 13/689,737, filed on Nov. 29, 2012, now Pat. No. 8,950,815.

(51) Int. Cl.
*B60N 2/48* (2006.01)
*B60N 2/44* (2006.01)

(52) U.S. Cl.
CPC ......... *B60N 2/4814* (2013.01); *B60N 2/4805* (2013.01); *B60N 2/4808* (2013.01); *B60N 2/4864* (2013.01); *B60N 2002/4455* (2013.01)

(58) Field of Classification Search
USPC .......................... 297/410, 391, 409, 411.37
See application file for complete search history.

(56) References Cited

U.S. PATENT DOCUMENTS

| | | | |
|---|---|---|---|
| 5,927,811 A | 7/1999 | Tseng | |
| 5,971,484 A | 10/1999 | Lamart et al. | |
| 6,022,079 A | 2/2000 | Bergsten et al. | |
| 6,168,237 B1 | 1/2001 | Lamart et al. | |
| 6,910,740 B2 * | 6/2005 | Baker | B60N 2/4844 297/391 |
| 7,073,863 B1 | 7/2006 | Low et al. | |
| 7,188,907 B1 | 3/2007 | Lai | |
| 7,201,450 B1 * | 4/2007 | Chen | 297/411.37 |
| 7,387,341 B1 * | 6/2008 | Tsai | 297/411.35 |
| 7,455,363 B2 | 11/2008 | Chung | |
| 7,562,936 B1 | 7/2009 | Veine et al. | |

(Continued)

FOREIGN PATENT DOCUMENTS

| | | |
|---|---|---|
| DE | 3900495 A1 | 7/1990 |
| EP | 0011009 A1 | 5/1980 |
| JP | 59114135 A | 7/1984 |

*Primary Examiner* — David E Allred
(74) *Attorney, Agent, or Firm* — Carlson, Gaskey & Olds, P.C.

(57) ABSTRACT

An adjustable headrest wherein the headrest independently moves along the substantially vertical axes of the mounting rods in response to a first-applied substantially vertical force applied to the headrest when the button I simultaneously actuated, and further wherein the headrest independently moves along the substantially horizontal axis of the slide rail in response to a second-applied substantially horizontal force applied to the headrest when the button is simultaneously actuated.

16 Claims, 5 Drawing Sheets (56) References Cited

U.S. PATENT DOCUMENTS

| | | | |
|---|---|---|---|
| 7,631,932 B2* | 12/2009 | Hoffmann | B60N 2/4864 297/216.12 |
| 8,038,219 B2* | 10/2011 | Boes | B60N 2/4885 297/406 |
| 8,534,760 B2 | 9/2013 | Kotz | |
| 8,662,592 B2 | 3/2014 | Keller et al. | |
| 2006/0214491 A1 | 9/2006 | Metz et al. | |
| 2006/0238011 A1* | 10/2006 | Bedford et al. | 297/411.35 |
| 2006/0244300 A1* | 11/2006 | Watson Savage | 297/397 |
| 2006/0250017 A1 | 11/2006 | Otto et al. | |
| 2007/0013219 A1 | 1/2007 | Chung | |
| 2009/0058162 A1* | 3/2009 | Boes | B60N 2/4885 297/406 |
| 2010/0127541 A1 | 5/2010 | Kotz | |
| 2010/0270841 A1* | 10/2010 | Sobieski et al. | 297/391 |
| 2010/0283306 A1* | 11/2010 | Boes | B60N 2/4808 297/408 |
| 2011/0109143 A1 | 5/2011 | Maddelein et al. | |
| 2012/0025584 A1* | 2/2012 | Chen et al. | 297/411.37 |
| 2012/0080926 A1* | 4/2012 | Fey | B60N 2/4817 297/410 |
| 2013/0002000 A1 | 1/2013 | Delling et al. | |
| 2013/0033082 A1* | 2/2013 | Huang | 297/411.36 |
| 2013/0161996 A1* | 6/2013 | Sanchez | 297/397 |
| 2014/0197671 A1 | 7/2014 | Frotz | |
| 2015/0145310 A1* | 5/2015 | Jeong | B60N 2/4814 297/408 |

* cited by examiner

FOUR-WAY ADJUSTABLE HEADREST

RELATED APPLICATIONS

This application is a continuation of prior U.S. application Ser. No. 13/689,737, filed Nov. 29, 2012, the entirety of which is herein incorporated by reference.

BACKGROUND

The invention relates to adjustable headrests for automobile passenger seats.

SUMMARY

An adjustable headrest wherein the headrest independently moves along the substantially vertical axes of the mounting rods in response to a first-applied substantially vertical force applied to the headrest when the button is simultaneously actuated, and further wherein the headrest independently moves along the substantially horizontal axis of the slide rail in response to a second-applied substantially horizontal force applied to the headrest when the button is simultaneously actuated.

BRIEF DESCRIPTION OF THE DRAWINGS

The drawings can be briefly described as follows.

DETAILED DESCRIPTION

Figure 1:
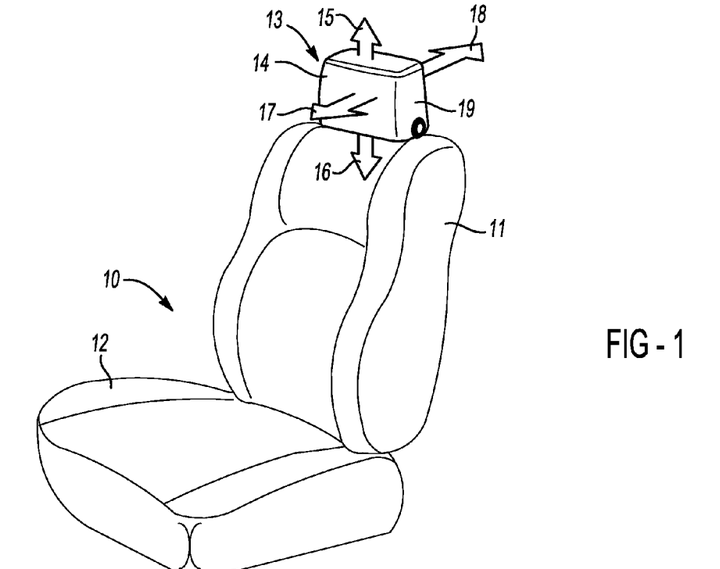
FIG. 1 is an isometric view of an automobile passenger seat showing the range of motions of the adjustable headrest invention.

Referring to FIG. 1, automobile passenger seat 10 has upper and lower seat portions, 11, 12, respectively. Adjustable headrest or head restraint 13 with upholstered cover 14 is connected to upper seat portion 11 as described below. Adjustable headrest 13 has a plurality of directions of movement. The directions of movement include up and down, as indicated by arrows 15 and 16, with respect to the ground along vertical axis 103 (see FIGS. 7 and 8). Independently, the directions of movement include forward and backward, as indicated by arrows 17 and 18, with respect to a seated passenger along a longitudinal axis 101 (see FIGS. 7 and 8). Button assembly 19 is used by the passenger's finger or thumb to actuate the internal mechanism described herein for obtaining and holding a desired overall position of headrest 11.

Figure 2:
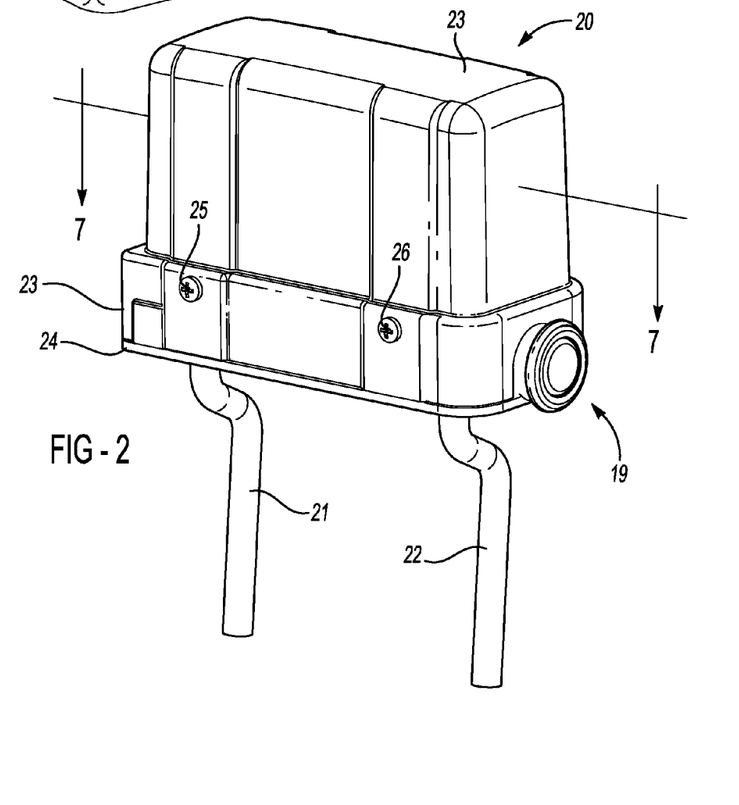
FIG. 2 is a front isometric view of the adjustable headrest assembly without an upholstered cover.

Referring to FIG. 2 a front isometric view is shown of adjustable headrest assembly 20 (with upholstered cover 14 removed). Headrest assembly 20 comprises mounting rods 21, 22, respectively, and shell 23. Mounting rod 21, 22, connect headrest assembly 20 to upper seat portion 11 and are in sliding communication with the upper seat portion. Within shell 23 is a box frame (not shown), wherein lower edge 24 of the box frame extends below shell 23. Shell 23 is connected to the box frame via a plurality of screws, including 25, 26, respectively. Button assembly 19 extends beyond shell 23 along a lateral axis (not shown) for locking and unlocking headrest 13 in order to provide the adjustments described herein.

Figure 3:
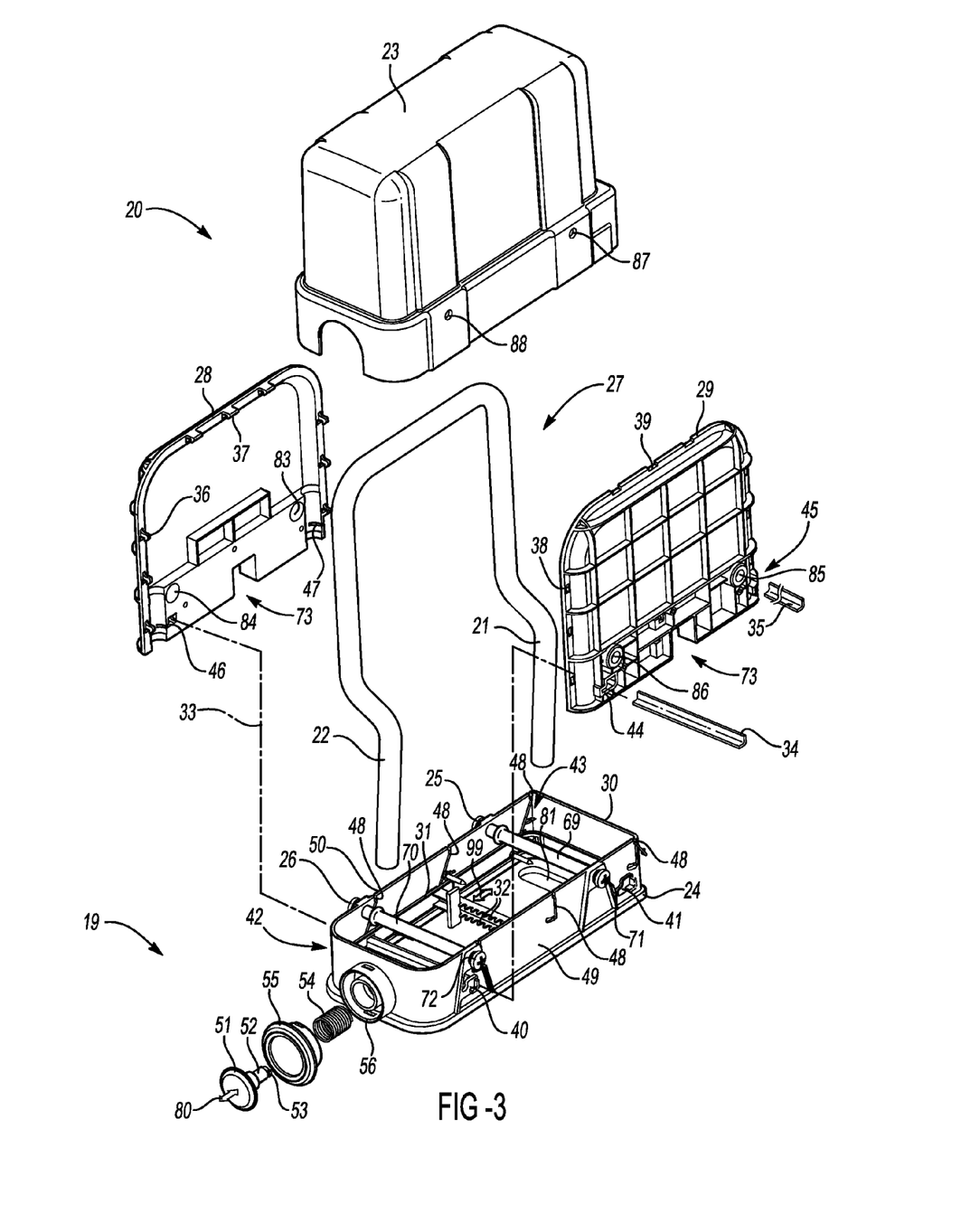
FIG. 3 is an exploded view of the headrest assembly of FIG. 2.

Referring to FIG. 3, an exploded view of headrest assembly 20 is shown. Some of the components of the headrest assembly include button assembly 19, mounting rods 21, 22 (which together form mounting rod assembly 27), mounting rod covers 28, 29, respectively, box frame 30, locking frame 31 and shell 23. A method for assembling these components comprises inserting locking frame 31 (already having means for receiving 32 projection 75) within box frame 30. Button assembly 19 is then connected to locking frame 31 via stem attachment feature 53. Dashed line 33 indicates that rod covers 28, 29, are assembled with locking frame 31 (within box frame 30) via slide bars 34, 35. Rods covers 28, 29, may be snapped together over rod assembly 27 via plurality of flexible tabs 36, 37, and their respective plurality of tab receiving features, 38, 39. Slide bars 34, 35, are inserted through apertures 40, 42, and 41, 43, respectively, of box frame 30; as well as through apertures 58, 60, and 66, 67, respectively, of locking frame 31 (see FIG. 4); and through apertures 44, 46, and grooves 45, 47, respectively, of rod covers 28, 29. Plurality of elastic elements such as springs 48 are inserted between slide bars 34, 35, and box frame 30 along sides 49, 50, of the box frame. Plurality of elastic elements 48 are also inserted between element 57 and sides 49, 50, of the box frame. Means of receiving 32 may move in the directions indicated by arrow 99 independently of slide bars 34, 35. Furthermore, button assembly 19 is comprised of button 51 having stem 52 with stem attachment feature 53, spring or elastic element 54, button guide 55 and guide retainer 56 (formed on box frame 30). The individual components related to the button are assembled as understood by a person having ordinary skill in the art. Button 51 and locking frame 31 may move in the directions indicated by arrow 104

Figure 4:
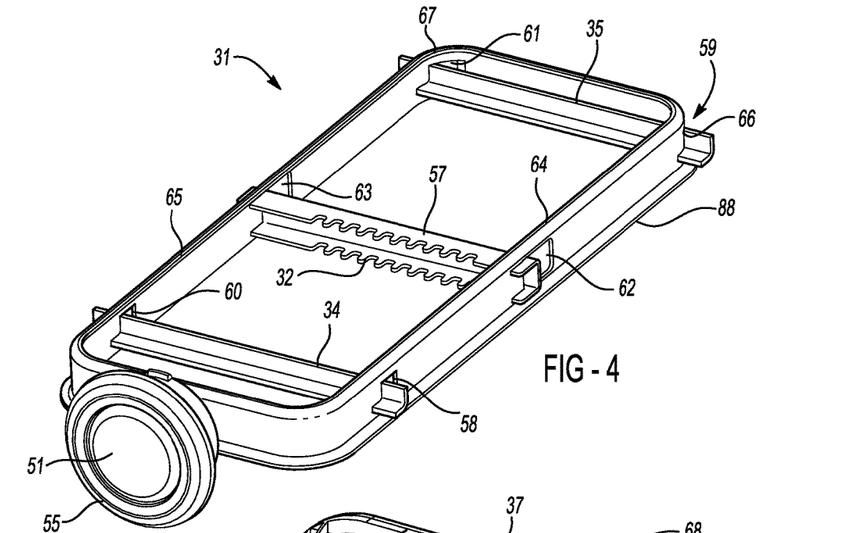
FIG. 4 is an isometric view of a locking frame and associated components for the headrest assembly of FIG. 2.

Referring to FIG. 4, an isometric view of locking frame 31, button 51, slide bars 34, 35, and element 57 having means for receiving 32 projection 75 are shown. Note that sufficient clearance exists between locking frame apertures 58, 60, and slide bar 34, respectively, and locking frame apertures 59, 61, and slide bar 35, so as to permit the slide bars to be readily inserted through the locking frame apertures (and also through the box frame and rod cover apertures/grooves as described above) during manufacturing of the headrest assembly. Apertures 58, 60, 62 and 63 are located within substantially straight portions 64, 65, of locking frame 31, whereas apertures 59, 61, are located within curved portions 66, 67, respectively, of the locking frame. Element 57 is constrained within apertures 62, 63, of locking frame 31 so as to allow element 57 selected freedom of movement along lateral axis 102 (see FIG. 8) within the locking frame. Similarly, slide bar 34 is constrained within apertures 58, 60, so as to allow selected freedom of movement along lateral axis 102 within the locking frame. Similarly, slide bar 35 is constrained within apertures 59, 61, so as to allow selected freedom of movement along the lateral axis.

Figures 5, 6:
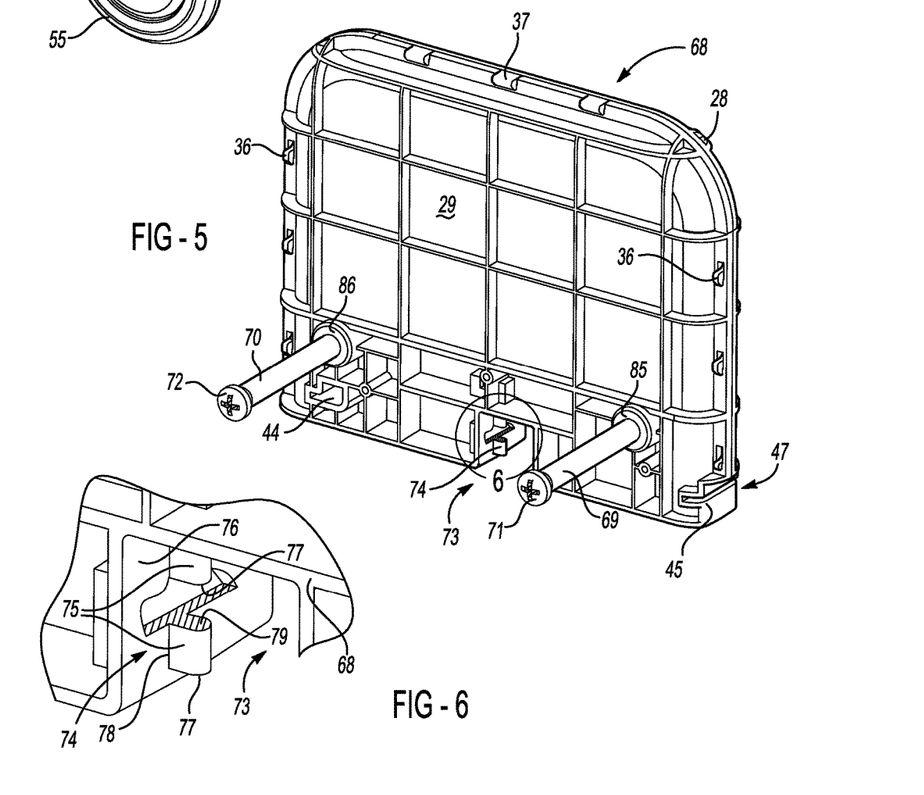
FIG. 5 is an isometric view of a mounting rod cover assembly of FIG. 3.
FIG. 6 is an enlarged isometric view of means for engaging the locking frame, showing the means in partial cross section, taken from circle 6 in FIG. 5.

Referring to FIG. 5, an isometric view of mounting rod cover assembly 68 is shown. Cover assembly 68 comprises front and rear mounting rod covers, 28, 29, respectively. The cover assembly is supported by, and in sliding communication with, slide rods 69, 70. Slide rods 69, 70, are connected to box frame 30 via screws 25, 26, and 71, 72. Aperture 44 is shown, which receives slide bar 34. Grooves 45 and 47 receive slide bar 35. Cover assembly 68 has channel 73, with means for engaging the locking frame 74 located therein.

Referring to FIG. 6, means for engaging the locking frame 74 is shown in detail. Means for engaging 74 may comprise tooth or projection 75 which may extend substantially perpendicular to wall 76 of cover assembly 68 a selected distance into channel 73. Projection 75 has distal end 77 and proximal end 78. Proximal end 78 may be formed integrally with wall 76, as indicated by cross section 79. Alternatively projection 75 may be a separate component which assembles together with wall 76 to provide means for engaging 74. In this case, proximal end 78 may extend into or through the thickness of wall 76. Alternatively, means for engaging 74 may comprise a pin, stud or cylinder.

Figure 7:
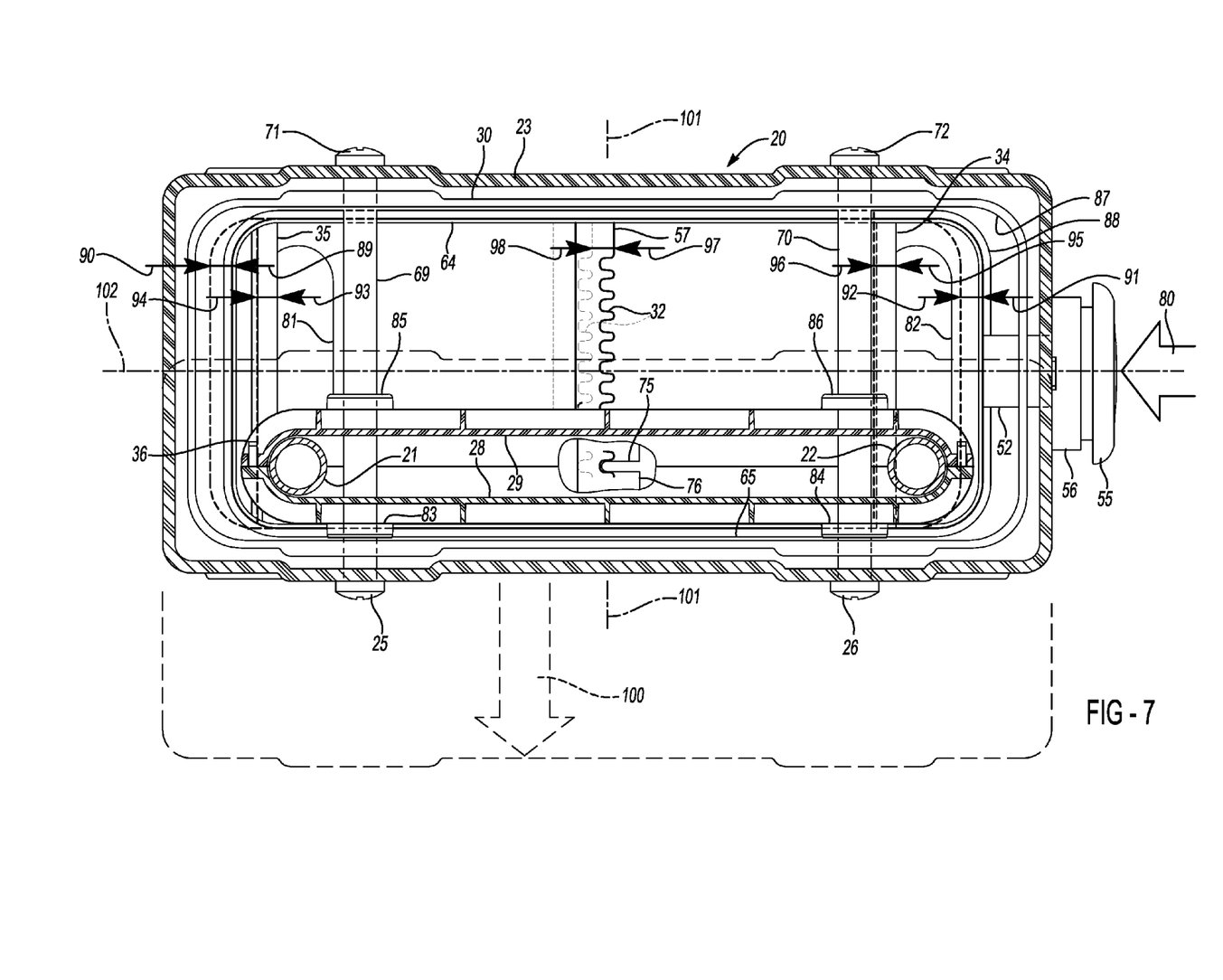
FIG. 7 is a partly-sectional top view taken along line 7-7 in FIG. 2.

Referring to FIG. 7, a partly-sectional top view of adjustable headrest assembly 20 taken along line 7-7 in FIG. 2 is shown. Mounting rods 21, 22, are shown in cross section as substantially round tubes, and pass through openings 81, 82, in the bottom of box frame 30. Assembled around the mounting rods via flexible tabs such as at reference number 36 are front and rear mounting rod covers, 28, 29, respectively. Slide rod 69 is in sliding communication with aperture 85 of cover 29. Slide rod 69 also passes through aperture 83 of cover 28 and is in sliding communication with an aperture in cover 28 that corresponds to 85. Slide rod 70 is in sliding communication with aperture 86 of cover 29. Slide rod 70 also passes through aperture 84 of cover 28 and is in sliding communication with an aperture in cover 28 that corresponds to 86. Furthermore, slide rods 69, 70, support box frame 30 and shell 23. The slide rods support the box frame via screws 25, 26, 71 and 72, which are installed in threaded bores (not shown) at the ends of the slide rods. Screws 71, 72, also pass through apertures 107, 108, respectively, of shell 23 to substantially secure the shell to the box frame. Locking frame 31 comprising substantially straight portions 64, 65, and flange 88, is supported by box frame 30 and rod covers 28, 29, via slide bars 34, 35, which pass through the locking frame and rod covers. Sufficient clearance exists between flange 88 and inner surface 87 of box frame 30 so as to facilitate movement by the locking frame within the box frame. Furthermore, slide bars 34, 35, are substantially in sliding communication with the rod covers 28, 29. Element 57 having means 32 for receiving projection 75 (which extends from wall 76 of the mounting rod cover assembly) is loosely constrained within apertures 62, 63, of substantially straight portions 64, 65. Slide bars 34, 35, are also loosely constrained within the locking frame as described above. Button guide 55 is inserted into and retained by guide retainer 56 via flexible tabs (see FIG. 3). Stem 52 passes through guide retainer 56 and is connected to the locking frame.

Figure 8:
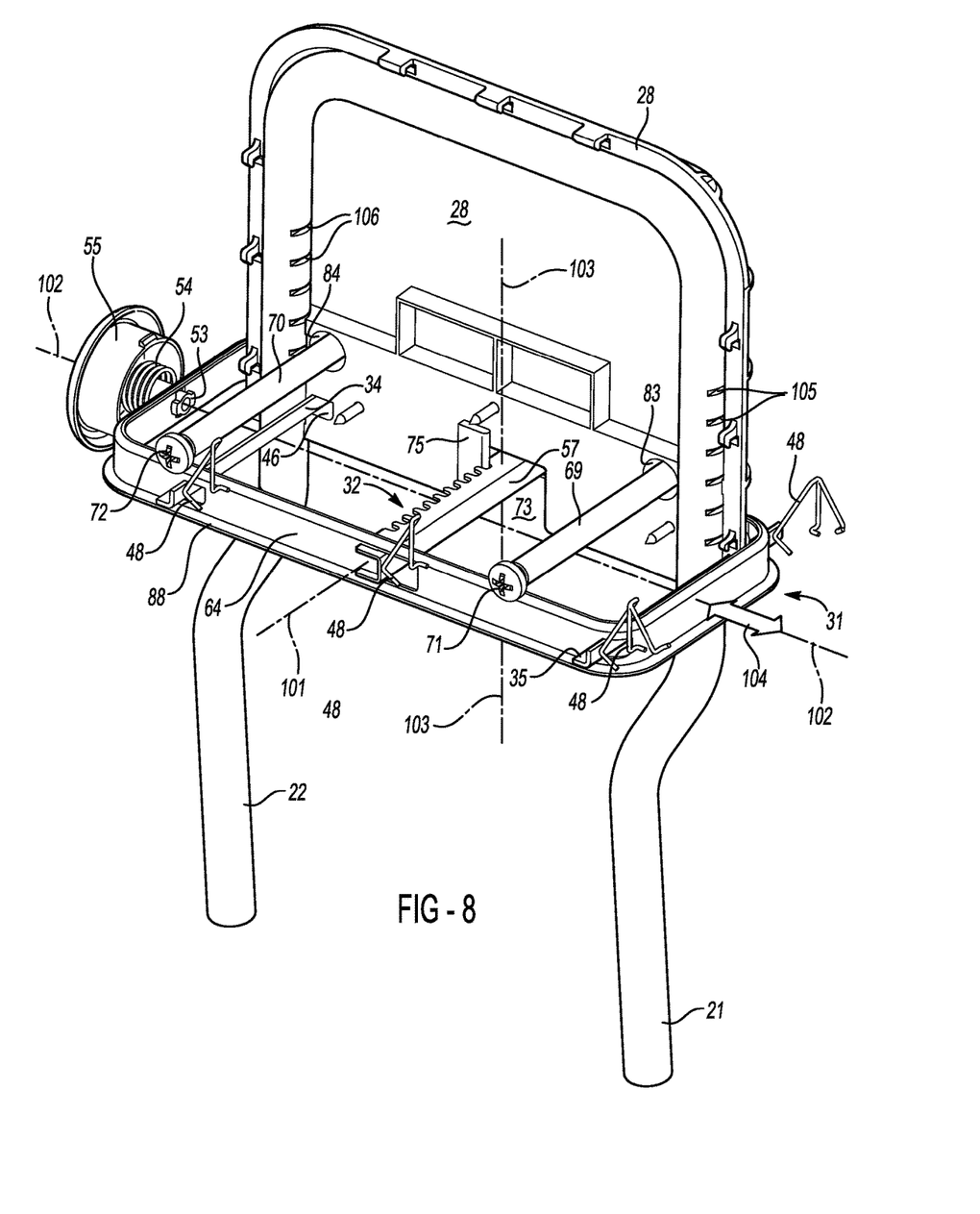
FIG. 8 is a rear isometric view of the locking frame, mounting rod and front mounting rod cover.

Referring to FIG. 8, a rear isometric view of locking frame 31, mounting rods 21, 22, and front mounting rod cover 28 is shown. Elastic elements 48 connected to the box frame (not shown) bear against the ends of each of slide bars 34, 35, and element 57, so as to impart a force along lateral axis 102. In operation, referring to the figures above, an automobile passenger desiring to change the position of adjustable headrest 13 pushes button 51 in the direction shown by arrow 80 in FIG. 7. In doing so, locking frame 31 overcomes the restraining or restoring forces of elastic elements 48, so that the locking frame moves or translates within box frame 30 and shell 23 along lateral axis 102 in the direction shown by arrow 80 in FIG. 7. When locking frame 31 moves in this fashion, it is displaced from a first position indicated by arrow 91 in FIG. 7 to a second position indicated by arrow 92. Correspondingly, the side of the locking frame opposite the button assembly is displaced from a first position indicated by arrow 89 in FIG. 7 to a second position indicated by arrow 90. Substantially simultaneously, slide bar 34 is displaced from a first position indicated by arrow 95 in FIG. 7 to a second position indicated by arrow 96. In so doing, slide bar 34 disengages one of plurality of grooves 106 on mounting rod 22. Also substantially simultaneously, slide bar 35 is displaced from a first position indicated by arrow 93 in FIG. 7 to a second position indicated by arrow 94.

In so doing, slide bar 35 disengages one of plurality of grooves 105 on mounting rod 21. Also substantially simultaneously, element 57 is displaced from a first position indicated by arrow 97 in FIG. 7 to a second position indicated by arrow 98. In so doing, means for receiving 32 disengages projection 75 on wall 76. At this point, and as long as the button remains depressed, headrest assembly 20 is substantially free to be guided by the passenger's hand or hands from a first overall headrest position to a second overall headrest position. The overall headrest position may comprise moving from a first vertical position to a second vertical position, and as indicated by arrow 100 in FIG. 7, substantially simultaneously a first longitudinal position to a second longitudinal position (as indicated by the dashed outline for cover 23).

After releasing the button the combination of elastic elements described herein act substantially together to move the slide bars and element 57 towards mounting rod 22. In so doing, slide bar 34 returns to its default position in contact with mounting rod 22. Slide bar 34 may immediately engage one of the plurality of grooves 106, so that slide bar 34 is substantially constrained from vertical movement by the engaged groove. Alternatively, slide bar 34 may not immediately engage one of the plurality of grooves 106, but rather come in contact with the outer, substantially round surface of mounting rod 22. In this event, a selected amount of additional vertical displacement by the passenger, without the passenger depressing the button, will permit slide bar 34 to engage one of the plurality of grooves 106.

After releasing the button, slide bar 35 returns to its default position in contact with mounting rod 21. Slide bar 35 may immediately engage one of the plurality of grooves 105, so that slide bar 35 is substantially constrained from vertical movement by the engaged groove. Alternatively, slide bar 35 may not immediately engage one of the plurality of grooves 105, but rather come in contact with the outer, substantially round surface of mounting rod 21. In this event, a selected amount of additional vertical displacement by the passenger, without the passenger depressing the button, will permit slide bar 35 to engage one of the plurality of grooves 105. When grooves of both mounting rods have been engaged, the headrest is locked in the desired new vertical position.

After releasing the button, means for receiving 32 return to their default position in contact with projection 75. Means for receiving 32 may immediately engage projection 75 as shown in FIG. 7, so that means for receiving 32 and element 57 are substantially constrained from longitudinal movement by the engaged projection. Alternatively, means for receiving 32 may not immediately engage the projection, but rather the projection may come in contact with a peak or "flat" of means 32. In this event, a selected amount of additional longitudinal displacement by the passenger, without the passenger depressing the button, will permit means 32 to engage projection 75, thus locking the headrest in the desired new longitudinal position. The mechanism for 20 described above thus facilitates and permits substantially simultaneous unlocking of the headrest assembly for repositioning together with substantially independent locking along the vertical and longitudinal axes of the headrest assembly.

The invention may also be described as follows:

An adjustable headrest having mounting rod portions along substantially parallel axes, comprising a locking frame having a longitudinal axis and two sides, substantially parallel to the longitudinal axis, the locking frame further having a bridge member extending between the two sides, which is substantially perpendicular to the longitudinal axis, the bridge member having means for receiving substantially transverse to the longitudinal axis; a box frame having first and second slide rails wherein the first slide rail is in sliding communication with the locking frame and substantially guides the locking frame in the fore/aft direction during use of the headrest; an enclosure about the mounting rod portions, the enclosure having first and second apertures, in sliding communication with the first and second slide rails, respectively, the enclosure further having means for engaging the means for receiving, wherein the means for engaging are substantially parallel to the longitudinal axis, wherein the means for engaging are adaptable for engagement with the means for receiving; a button (connected to/in mechanical communication with) the locking frame, wherein a substantially normal force applied to the button sufficient to overcome the return force of a resilient element causes the locking frame to translate or displace along the longitudinal axis of the locking frame and the means for engaging to disengage the means for receiving; a shell connected to the box frame, wherein the shell support a foam element; wherein the headrest (independently) moves along the substantially vertical axes (of the mounting rods) in response to a first-applied substantially vertical force applied to the headrest when the button is simultaneously actuated; and further wherein the headrest (independently) moves along the substantially horizontal axis of the slide rail in response to a second-applied substantially horizontal force applied to the headrest when the button is simultaneously actuated.

An adjustable headrest wherein the means for receiving are selected from the group consisting of channels, notches, grooves, apertures and blind holes.

An adjustable headrest wherein the means for receiving 19 comprising a plurality of channels; wherein the width of each channel is between about 2 to about 3 mm; wherein the distance between each channel is between about 8 to about 9 mm.

An adjustable headrest wherein the means for engaging 58 comprising a substantially rectangular tooth; wherein the width of each tooth is between about 1.5 to about 2.5 mm.

An adjustable headrest wherein the means for receiving 19 comprising a plurality of apertures; wherein the diameter of each aperture is between about 5 to about 6 mm; wherein the distance between each aperture is between about 8 to about 9 mm.

An adjustable headrest wherein the means for engaging 58 comprising a locking pin wherein the diameter of the locking pin is between about 4 to about 5 mm.

An adjustable headrest having mounting rod portions along substantially parallel axes, comprising a locking frame having a longitudinal axis and two sides substantially parallel to the longitudinal axis, the locking frame further having a bridge member extending between the two sides, which is substantially perpendicular to the longitudinal axis, the bridge member having a plurality of apertures substantially transverse to the longitudinal axis; a box frame having first and second slide rails, wherein the first slide rail is in sliding communication with the locking frame and substantially guides the locking frame in the fore/aft direction during use of the headrest; an enclosure about the mounting rod portions, the enclosure having first and second apertures in sliding communication with the first and second slide rails, respectively, the enclosure further having a locking pin affixed thereto, wherein the locking pin is substantially parallel to the longitudinal axis, wherein the locking pin is adaptable for engagement with any of the plurality of apertures; a button (connected to/in mechanical communication with) the locking frame, wherein a substantially normal force FN applied to the button sufficient to overcome the return force of a resilient element causes the locking frame to translate/displace along the longitudinal axis of the locking frame and the locking pin to disengage its respective aperture; a shell connected to the box frame, wherein the shell support a foam element; wherein the headrest (independently) moves along the substantially vertical axes (of the mounting rods) in response to a first-applied substantially vertical force F1 applied to the headrest when the button is simultaneously actuated; and further wherein the headrest (independently) moves along the substantially horizontal axis of the slide rail in response to a second-applied substantially horizontal force F2 applied to the headrest when the button is simultaneously actuated.

An adjustable headrest wherein the locking frame and box frame form a substantially rectangular configuration.

An adjustable headrest wherein the locking frame and box frame form a substantially trapezoidal configuration.

An adjustable headrest wherein the box frame having a plurality of first slide rails.

An adjustable headrest wherein the box frame having a plurality of second slide rails.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will also include all embodiments falling within the scope of the following claims.

What is claimed is:

1. An adjustable headrest for a seat, comprising:
   a headrest mountable to the seat, the headrest including a button moveable between an actuated position and a waiting position;
   wherein a portion of the headrest is moveable in a forward direction, a backward direction, an upward direction, and a downward direction relative to the seat when the button is in the actuated position;
   a generally rectangular locking frame moveable in response to movement of the button; and
   at least one mounting rod supporting the headrest relative to the seat, wherein the locking frame is engaged with the at least one mounting rod and a shell of the headrest when the button is in the waiting position;

wherein the locking frame is moveable in a longitudinal direction in response to movement of the button, the longitudinal direction is perpendicular to the axis of the at least one mounting rod and perpendicular to the forward and backward directions;

wherein the locking frame includes spaced apart front and rear straight portions supporting at least one slide bar and at least one bridge member, the bridge member comprising a plurality of peaks, and the at least one mounting rod including a plurality of grooves along an axis thereof, the slide bar received in one of the plurality of grooves and one of the plurality of peaks engaged by a locking pin fixed relative to the at least one mounting rod when the button is in the waiting position, and wherein the engagement of one of the grooves and the engagement of one of the peaks is achieved by movement of the slide bar and the bridge member in the longitudinal direction.

2. The adjustable headrest as recited in claim 1, wherein the headrest is locked relative to the seat when the button is in the waiting position.

3. The adjustable headrest as recited in claim 2, wherein, when the headrest is locked relative to the seat, the headrest is not moveable relative to the seat.

4. The adjustable headrest as recited in claim 1, wherein the shell supports a foam element.

5. The adjustable headrest as recited in claim 1, wherein the slide bar is not received in any of the plurality of grooves when the button is in the actuated position.

6. The adjustable headrest as recited in claim 1, wherein the locking frame includes the bridge member engaged with the shell when the button is in the waiting position.

7. The adjustable headrest as recited in claim 6, wherein the bridge member includes a plurality of apertures and the shell includes the locking pin receivable in the apertures when the button is in the waiting position.

8. The adjustable headrest as recited in claim 7, wherein the locking pin is not received in any of the apertures of the bridge when the button is in the actuated position.

9. The adjustable headrest as recited in claim 7, wherein at least one spring is engaged with the locking frame, the at least one spring biasing the button to the waiting position.

10. The adjustable headrest as recited in claim 1, wherein, when the button is in the actuated position, the headrest is moveable relative to the seat in one of the forward direction and the backward direction while simultaneously being moved in one of the upward direction and the downward direction.

11. The adjustable headrest as recited in claim 1, wherein the forward and backward directions are perpendicular to the upward and downward directions.

12. The adjustable headrest as recited in claim 11, wherein the button is moveable in a direction parallel to the direction of movement of the locking frame and perpendicular to each of the forward, backward, upward, and downward directions.

13. An adjustable headrest, comprising:
a button, wherein at least a portion of the adjustable headrest is moveable in a forward direction, a backward direction, an upward direction, and a downward direction relative to a seat when the button is actuated;
a shell and at least one mounting rod supporting the shell; and
a generally rectangular locking frame moveable in response to movement of the button, wherein the locking frame is engaged with the at least one mounting rod and a shell of the headrest when the button is in the waiting position, and wherein the locking frame is moveable in a longitudinal direction in response to movement of the button, the longitudinal direction is perpendicular to the axis of the at least one mounting rod and perpendicular to the forward and backward directions; and
wherein the locking frame includes spaced apart front and rear straight portions supporting at least one slide bar and at least one bridge member, the bridge member comprising a plurality of peaks, and the at least one mounting rod including a plurality of grooves along an axis thereof, the slide bar received in one of the plurality of grooves and one of the plurality of peaks engaged by a locking pin fixed relative to the at least one mounting rod when the button is in the waiting position, and wherein the engagement of one of the grooves and the engagement of one of the peaks is achieved by movement of the slide bar and the bridge member in the longitudinal direction.

14. The adjustable headrest as recited in claim 13, wherein the shell is moveable in any of a forward direction, a backward direction, an upward direction, and a downward direction relative to the at least one mounting rod when the button is actuated.

15. The adjustable headrest as recited in claim 14, wherein the forward and backward directions are perpendicular to an axis of the at least one mounting rod, and wherein the upward and downward directions are parallel to the axis of the at least one mounting rod.

16. The adjustable headrest as recited in claim 15, wherein the button is moveable in a direction perpendicular to the axis of the at least one mounting rod.

* * * * *

UNITED STATES PATENT AND TRADEMARK OFFICE
CERTIFICATE OF CORRECTION

PATENT NO. : 9,649,958 B2  
APPLICATION NO. : 14/541778  
DATED : May 16, 2017  
INVENTOR(S) : Wang et al.

Page 1 of 1

It is certified that error appears in the above-identified patent and that said Letters Patent is hereby corrected as shown below:

On the Title Page

Item (72) inventors should read:
(72) Inventors: Jianhua Wang, Novie, MI (US);
Yintai Jiang, Shanghai, (CN);
Chengke Tong, Shanghai (CN);
Xiaogang Wang, Windsor, Ontario (CA)

Signed and Sealed this
Twenty-fifth Day of September, 2018

Andrei Iancu
*Director of the United States Patent and Trademark Office*